United States Patent [19]

Su

[11] Patent Number: 4,814,946

[45] Date of Patent: * Mar. 21, 1989

[54] FUSE ASSEMBLY FOR SOLID ELECTROLYTIC CAPACITOR

[75] Inventor: Tsung-Yuan Su, Greenville, S.C.

[73] Assignee: Kemet Electronics Corporation, Del.

[*] Notice: The portion of the term of this patent subsequent to Aug. 9, 2005 has been disclaimed.

[21] Appl. No.: 194,831

[22] Filed: May 23, 1988

Related U.S. Application Data

[63] Continuation-in-part of Ser. No. 123,359, Nov. 20, 1987, Pat. No. 4,763,228.

[51] Int. Cl.$^4$ .................. H01G 9/00; H01G 1/11; H01H 85/04
[52] U.S. Cl. ............................ 361/523; 361/275; 337/297
[58] Field of Search ............... 361/275, 433; 337/290, 337/297

[56] References Cited

U.S. PATENT DOCUMENTS

| | | | |
|---|---|---|---|
| 3,197,593 | 7/1965 | 5Lange et al. | 337/159 |
| 4,042,950 | 8/1977 | Price | 337/290 X |
| 4,107,759 | 8/1978 | Shirn et al. | 361/275 |
| 4,107,762 | 8/1978 | Shirn et al. | 361/433 |
| 4,193,106 | 3/1980 | Coleman | 361/275 |
| 4,224,656 | 9/1980 | De Matos et al. | 361/433 |
| 4,539,623 | 9/1985 | Irikura et al. | 361/433 |
| 4,706,059 | 11/1987 | Schmitt | 337/297 |
| 4,763,228 | 8/1988 | T-Y Su | 361/433 |

Primary Examiner—Donald A. Griffin
Attorney, Agent, or Firm—Norman L. Balmer

[57] ABSTRACT

A solid electrolytic capacitor having an exothermic alloying fuse attached thereto, the fuse comprising a strip of metal, silicone surrounding the strip and an insulative material disposed on opposite sides of the silicone composition to form a sandwich.

8 Claims, 3 Drawing Sheets

4,814,946

FUSE ASSEMBLY FOR SOLID ELECTROLYTIC CAPACITOR

This application is a continuation-in-part of application Ser. No. 123,359, filed Nov. 20, 1987, and now U.S. Pat. No. 4,763,228, issued Aug. 9, 1988.

BACKGROUND OF THE INVENTION

This invention relates to an exothermic alloying fuse assembly and to a solid electrolytic capacitor package for forming a fused solid electrolyte capacitor assembly.

Miniature size solid electrolytic capacitors are used on circuit boards in large numbers by the electronics industry in the manufacture of computers. If a solid electrolytic capacitor on a circuit board should prove to be defective and overheat it is essential that the current flow to such capacitor be interrupted to prevent the temperature of the capacitor from rising to a dangerously high level which can result in the ignition and burning of the capacitor and ultimately in the destruction of the device incorporating the faulty capacitor. Accordingly, it is common practice to attach a fusing element to a capacitor lead, preferably within the capacitor housing itself, which actuates in response to the electrical current passed by the failing capacitor and induces an open circuit.

Most conventional fusing elements consist of a low melting metal member placed in series with a capacitor terminal and its corresponding lead. The metal member is adapted to melt at a predetermined current level which should, at least in theory, open up the electrical circuit and isolate the capacitor. In practice however, if the fusing element is embodied within the capacitor, as is preferred, the encapsulating material holds the element in situ even after it is melted which still allows current to flow. Accordingly, the reliability of a low melting temperature metal for use as a fusible link in a capacitor assembly is very poor.

Alloying metals which alloy exothermically and rapidly when brought to their kindling temperature have been used as a substitute for the low melting metal fuse in constructing a fused capacitor. A typical alloying material of this type consists of a bimetallic composite of aluminum and a precious metal such as palladium. The electrical current required to heat the fuse resistively to the kindling temperature is determined by the effective length of the alloying material and its cross sectional diameter. Unfortunately, when incorporated into the body of a miniature size solid electrolytic capacitor the bimetallic fuse may be equally as unreliable as the low melting metal fuse. The exothermic reaction of the bimetallic fuse results in very high temperatures which causes the resinous encapsulant surrounding the bimetallic fusing element to char. The charred material forms a carbonaceous deposit which supports arcing and to a more limited extent current flow. In addition, assembly of a bimetallic alloying fuse in a miniature solid electrolytic capacitor has proven to be extremely difficult because of its fragile nature. The fusing bimetallic element must be very small in diameter, generally between 1-5 mils in thickness to provide the desired low electrical current to heat the wire resistively to its kindling temperature. Accordingly, it is easy to break and difficult to work with. Moreover, the joining of the ends of a bimetallic fuse to a capacitor lead so as to complete an electrical circuit must be done with great care to avoid initiating the exothermic reaction.

It is therefore desired to provide an exothermic alloying fuse assembly which is easily incorporated into an electrical device such as a solid electrolytic capacitor and which will not leave a carbon residue after ignition to support further conduction.

SUMMARY OF THE INVENTION

Broadly, the miniature fuse assembly of the present invention comprises a composite of exothermically alloying metals in the form of a wire or ribbon having a predetermined length and cross sectional area;

a high temperature composition of silicone surrounding said strip of wire or ribbon;

a thin strip of electrically insulative material disposed on opposite sides of said silicone composition to form a sandwich; and conductive means in contact with said strip of wire or ribbon and extending from opposite ends of said sandwich for interconnecting said fuse assembly within an electric circuit.

The present invention also relates to a capacitor package for forming a fused solid electrolyte capacitor assembly incorporating a fuse assembly comprising:

a solid electrolytic capacitor body having two terminals;

a lead frame for each terminal; and said fuse assembly coupling one terminal of said capacitor body to its corresponding lead frame and including an exothermic alloying composite of metals in the form of a strip of predetermined length and cross-sectional area and a pair of high temperature film strips for enclosing said alloying strip to form a sandwich, with each film strip including a high temperature layer of pressure sensitive silicone in intimate contact with said alloying strip and a layer of an electrically insulating material overlaying said layer of silicone and means for conductively coupling said alloying strip between one of said terminals and its corresponding lead frame.

DESCRIPTION OF THE PREFERRED EMBODIMENTS

Figure 1:
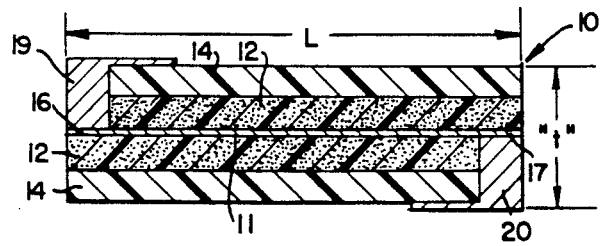
FIG. 1 is a cross sectional view of one embodiment of the fuse assembly of the present invention.
Figure 2A:
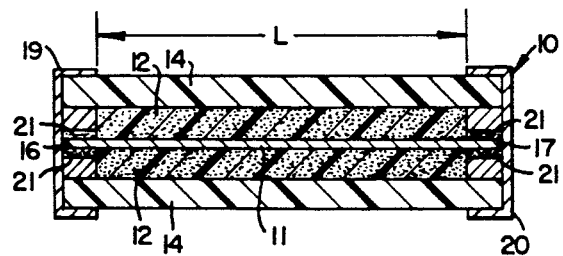
FIG. 2A is a variation of the fuse assembly of FIG. 1.
Figure 2B:
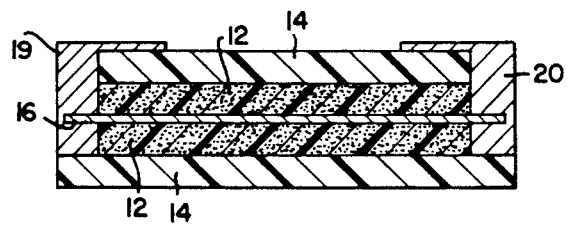
FIG. 2B shows another variation of the fuse assembly of FIG. 1.

FIGS. 1, 2A and 2B show various embodiments of the miniature fuse assembly 10 of the present invention. In FIG. 1 a fusible alloying wire 11 is shown extending transversely between an arrangement of composite layers 12 and 14 which lie over the wire 11 on both sides thereof to form a sandwich. Each inner layer 12 is a coating of a high temperature silicone composition disposed in intimate contact with the fusible alloying wire 11. Each outer layer 14 is of a high temperature nonconductive material in the form of a thin strip composed preferably of an organic polymer film, woven fiberglass or other thin electrically insulative material. The fusible alloying wire 11 may consist of any combination of exothermic alloying materials which will ignite and deflagrate upon application of a predetermined current to yield an electrical open circuit. A preferred fusible alloying wire consists of an aluminum and a ruthenium and/or palladium composite in any desired form and geometry. A fusible alloying wire composed of an aluminum inner core and a clad palladium outer coating is commercially available from the Pyrofuse Corporation.

Each silicone coating 12 may be any high temperature silicone composition which will maintain its integrity and not form conductive, carbonaceous residues at the maximum actuation (3000° C.) temperature of the fusible alloying wire 11. For the composition indicated above the wire 11 will start to decompose at a kindling temperature generally about the order of 650° C. and reach a maximum temperature during reaction of about 3000° C. A preferred silicone composition which satisfies this criterion is poly(dimethylsiloxane) or its equivalent. The silicone coating 12 should also possess a relatively tacky consistency at ambient temperature so that each opposite layer 12 sticks to one another. It is essential that the thickness of each silicon coating 12 equal at least one-half of the diameter of the wire 11 so that the wire 11 is completely surrounded by silicone except at the desired points of termination.

The inner layer 12 and the outer layer 14 on each side of the wire 11 may be preassembled as a composite tape which is preferably in the form of a strip. The preferred composite tape would consist of an outer layer 14 of a thin tape, typically 3 mils or less in thickness, of an organic polymer film such as polyester, e.g., Mylar, or a polyimide, e.g., Kapton, or even of an inorganic material, such as fiberglass ribbon, and an inner layer 12 of a high temperature pressure sensitive silicone which functions both as an adhesive for the polymer film and a coating for the fusible alloying wire. The use of a composite tape is a significant attribute of the invention in terms of the ease of manufacture of a fuse assembly and the simplicity in integrating the fuse in the manufacture of an electrolyte capacitor. It also facilitates the use of a variety of different arrangements for coupling the capacitor lead to the corresponding capacitor terminal. The thickness of the outer layer 14 is not critical although a thin layer of generally between about 1 to 5 mils is preferred. The layer 14 should also be flexible and preferably in the form of a thin strip of electrically insulating tape.

The fusible wire 11 is of a predetermined diameter of generally between 1-5 mils and has a predetermined length "L" which need not conform to the width of the fuse assembly 10. The length and diameter of the fusible wire 11 is selected so that the fuse will not actuate when subjected to electrical current from the manual charging and discharging of the capacitor (e.g. about 1 ampere) but will activate with the large currents usually associated with the failure of the capacitor (e.g. about 10 or more amperes). It is generally desirable to use the shortest length and largest diameter consistent with providing the necessary fuse protection so that the fuse introduces a minimum of series resistance to the capacitor.

The ends 16 and 17 of the fusible wire 11 in the assembly 10 contact terminating caps 19 and 20 composed of any conductive material of e.g., a metal such as copper or nickel or of any commercially available high temperature conductive epoxy resin. The end caps 19 and 20 may be form fitted, attached, sprayed or applied in the form of a putty which is cured in situ. In FIG. 1 the end caps 19 and 20 extend over a portion of the ends 16 and 17 of the fusible wire 11 on opposite sides thereof with each end cap 19 and 20 having a thickness equal to less than the thickness "t" of the fuse assembly 10. The conductive leads of any electrical device may be connected or soldered to the end caps 19 and 20. FIGS. 2A and 2B show several variations in the configuration of FIG. 1 for forming a conductive termination between the end caps and the fuse wire 11 in the assembly 10. In FIG. 2A the silicone layers 12 do not extend over the full length "L" of the wire 11. Instead the wire 11 is first soldered at each end 16 and 17 to a member 21 of any desired conductive material composition. The end caps 19 and 20 are then mounted over the ends of the assembly 10 in abutment with the soldered ends of the wire 11. FIG. 2B is another variation of the end configuration of FIG. 1 with the outer layer 14 on the bottom side of the assembly 10 extending the full width of the assembly and with each end cap 19 and 20 mounted over the bottom layer 14 on the same side with the ends 16 and 17 of the wire 11 embedded in the end caps 19 and 20 respectively.

A fused electrolytic capacitor package integrating the miniature fuse assembly 10 of the present invention is illustrated in FIGS. 3 to 8 inclusive. The capacitor package 30 includes a solid electrolytic anode body 32, a negative lead or lead frame 33, a positive lead or lead frame 34 and an organic encapsulating resin 35. The anode body 32 is preferably formed from tantalum having a surface metal oxide film 36 which serves as the dielectric layer, a coating of manganese dioxide 37 which serves as the solid electrolyte and a counter electrode layer 38 representing the negative terminal of the capacitor 30. The outer layer 38 is composed of an inner graphite film (not shown) covering the electrolyte layer 37 and a conductive outer layer 38 of e.g. silver covering the graphite film.

The negative lead frame 33 is connected through the fuse assembly 10 to the negative terminal 38 of the capacitor package 30. The positive lead frame 34 is connected to the positive terminal 39 which extends from the tantalum anode body 32. Although it is preferred to combine the fuse assembly 10 in the negative leg of the capacitor package 30 it may be incorporated in the positive leg between the positive terminal 39 and the positive lead frame 34.

The fuse assembly 10 may either be assembled as shown in FIGS. 1 or 2 with the end terminations 19 and 20 interconnecting a capacitor lead and its corresponding terminal or in accordance with the preferred arrangements shown in FIGS. 3-8.

Figure 3:
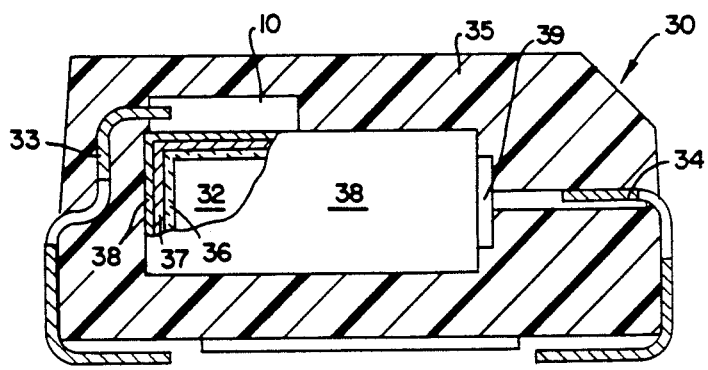
FIG. 3 is a side elevation in cross section of a solid electrolyte capacitor package incorporating the exothermic alloying fuse assembly of the present invention.
Figure 3A:
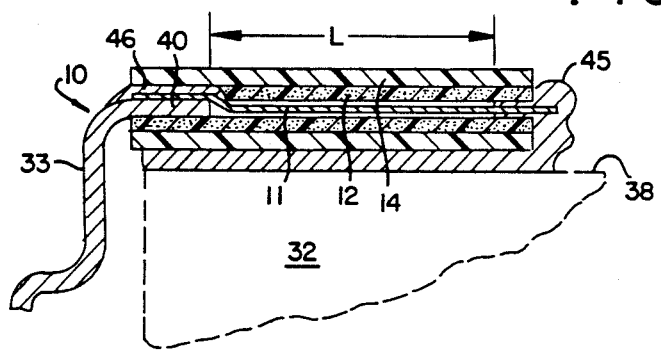
FIG. 3A is an enlarged cross section of the fuse assembly and its interconnection between the capacitor terminal and lead of FIG. 3.
Figure 4:
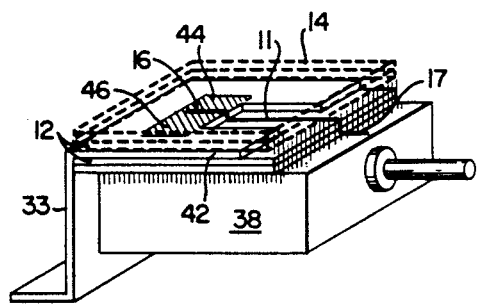
FIG. 4 is a perspective view of the integrated fuse assembly and capacitor body of FIG. 3.
Figure 5:
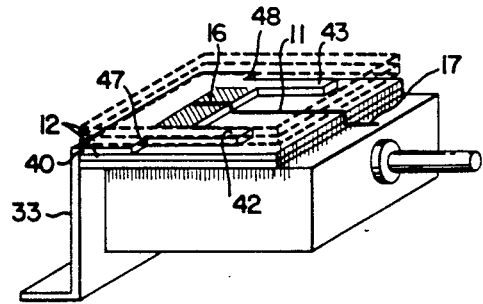
FIG. 5 is a view similar to FIG. 4 showing a modified variation of the fuse assembly.

In FIGS. 3, 3A and 4 the fuse assembly 10 is shown incorporated in the negative leg of the capacitor package 30. The fuse assembly 10 contains the fusible alloying wire 11 in an arrangement sandwiched between a composite tape having an inner pressure sensitive silicone coating 12 in intimate contact with the wire 11 on each opposite side thereof and an outer layer 14 of a thin strip typically of polyester or polyimide film covering the silicone coating 12 on each opposite side thereof.

In order to provide an effective length "L" for the fusible alloying wire 11 the negative lead frame 33 has one end 40 bifurcated to form a notched opening 41 with two arms 42 and 43 on opposite sides of the opening 41 extending parallel with the fusible wire 11. The effective length "L" of the fusible wire 11 represents a predetermined length of fusible wire 11 through which current is forced to pass from the negative lead frame 33 to the negative terminal 38. The fusible alloying wire 11 extends across the opening 41 with one end 16 overlying the area 44 of the lead frame 33 and with its opposite end 17 contacting the negative terminal 38 of the capacitor 30. If the fuse assembly 10 is formed from endless composite tape the fusible wire 11 lies in the direction transverse to the longitudinal axis of the assembly 10. The fusible alloying wire 11 may also terminate upon contact with a conductive medium 45 such as a conductive epoxy resin which is coated over the negative terminal 38 underlying the bottom layer 14 and around the side of the assembly 10 in contact with of the fusible wire 11.

The area 44 adjacent the notched opening 41 of the lead frame 33 is covered with a conductive epoxy resin 46 before the top layers 12 and 14 of the composite tape are laid down.

The notched opening 41 of the lead frame 33 may have any desired shape or configuration. In the configuration shown in FIG. 5 the bifurcated end 40 of the negative lead frame 33 has two additional cut out sections 47 and 48 at each opposite side of the fuse assembly 10 to enhance the bonding between the upper composite tape and the lower composite tape. The upper composite tape consists of the combined upper layers 12 and 14 whereas the lower composite tape consists of the combined bottom layers 12 and 14.

Figure 8:
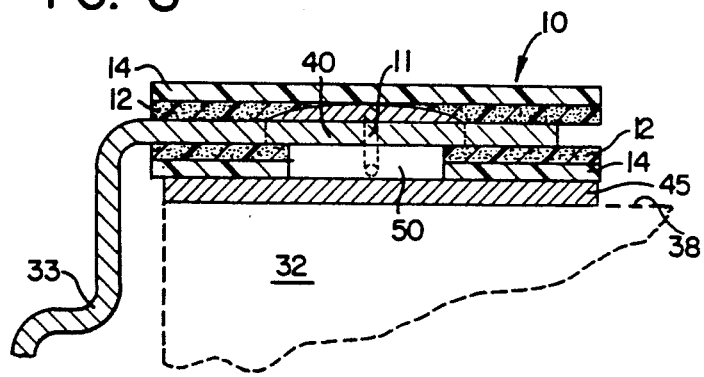
FIG. 8 is an enlarged cross section of the fuse assembly of FIG. 6.
Figure 7:
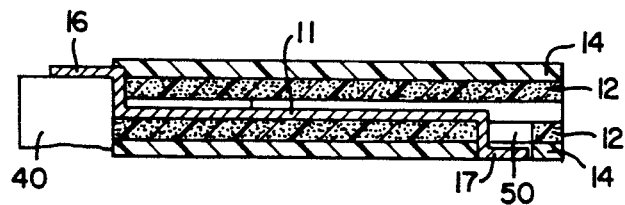
FIG. 7 is a section taken along the lines A—A of FIG. 6.
Figure 6:
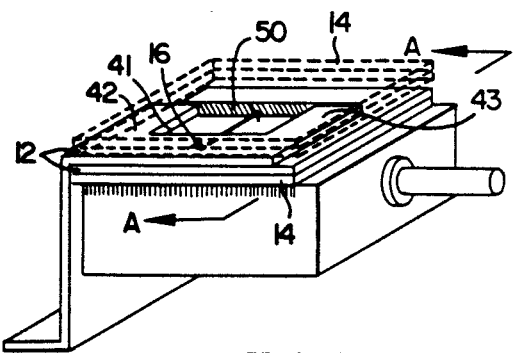
FIG. 6 is another arrangement to the fuse assembly of FIG. 3.

In the configuration shown in FIGS. 6 through 8 the fusible alloying wire 11 is arranged in parallel with the longitudinal axis of the fuse assembly 10 i.e., lengthwise of the fuse assembly 10 and in a direction transverse to the longitudinal axis of the anode 32. The lead frame 33 is bifurcated to provide a notched opening 41 with the two arms 42 and 43 on opposite sides thereof extending parallel with the longitudinal axis of the fuse assembly 10. The fusible wire 11 extends across the notched opening 41 with its end 16 overlying the end 40 of the lead frame 33 at its bifurcated end 40 and its opposite end 17 in contact with the negative terminal 38 or in contact with a conductive epoxy medium 45 overlying the negative terminal 38. In order to establish an effective bond between the end 17 of the fusible wire 11 and the negative terminal 38 a section 50 of the bottom layer 12 and 14 may be punched out so that a conductive epoxy can be directly applied into the punched out area over the end 17 of the fusible wire.

I claim:

1. A capacitor package for forming a fused solid electrolyte capacitor including a capacitor body having a positive and negative terminal, a lead for each terminal, a miniature fuse assembly electrically connected between one of said terminals and its corresponding lead and a molded resinous material surrounding said capacitor package with each lead frame extending therefrom, said miniature fuse assembly comprising;
    a strip of a composite of exothermically alloying metals of predetermined length and cross-section;
    a high temperature composition of silicone exhibiting an adhesive characteristic surrounding said alloying strip;
    a thin strip of electrically insulative material disposed on opposite sides and in contact with said silicone composition to form a sandwich; and
    means for electrically coupling said alloying strip at one end thereof to one of said terminals with said corresponding lead frame electrically coupled to said alloying strip at its opposite end.

2. A capacitor package as defined in claim 1 wherein said thin strip of insulative material and said high temperature silicone constitute a preformed composite tape with said insulative material on one side thereof and said silicone on the other side.

3. A capacitor package as defined in claim 2 wherein said thin strip of insulative material is composed of a material selected from the class consisting of woven fiberglass.

4. A capacitor package as defined in claim 3 wherein said means for electrically coupling said alloying strip to said capacitor terminal is a high temperature conductive epoxy.

5. A capacitor package as defined in claim 4 wherein said lead is bifurcated at the point of attachment with the fuse assembly to form an open area with arms extending on opposite sides of the open area and with said alloying strip extending between said arms and across said open area parallel to the longitudinal axis of the capacitor anode.

6. A capacitor package as defined in claim 4 wherein said lead is bifurcated at the point of attachment with the fuse assembly to form an open area with arms extending on opposite sides of the open area and with said alloying strip extending between said arms and across said open area in a direction transverse to the longitudinal axis of the capacitor anode.

7. A miniature fuse assembly for an electrical device comprising:
    a composite of exothermically alloying metals in the form of a strip having a predetermined length and cross-section;
    a high temperature composition of silicone surrounding said strip;
    a thin strip of an electrically insulating material disposed on opposed sides of said silicone composition to form a sandwich; and
    conductive means in contact with said strip and extending from opposite ends of said sandwich for interconnecting said fuse assembly within an electric circuit.

8. A miniature fuse assembly as defined in claim 7 wherein said thin strip of electrically insulating material is composed of a material selected from the class consisting of woven fiberglass.

* * * * *